United States Patent
Michaelis et al.

(10) Patent No.: US 11,429,958 B1
(45) Date of Patent: Aug. 30, 2022

(54) SYSTEM, METHOD AND APPARATUS FOR RESOURCE ACCESS CONTROL

(71) Applicant: Beyond Aerospace Ltd., Kelowna (CA)

(72) Inventors: Oliver Michaelis, San Diego, CA (US); Mike Ball, Kelowna (CA); Charles Andrew Hugh Baker, Kelowna (CA); Peter Alexander Carides, San Diego, CA (US)

(73) Assignee: Beyond Aerospace LTD., Kelowna (CA)

( * ) Notice: Subject to any disclaimer, the term of this patent is extended or adjusted under 35 U.S.C. 154(b) by 0 days.

(21) Appl. No.: 17/386,377

(22) Filed: Jul. 27, 2021

Related U.S. Application Data

(60) Provisional application No. 63/214,326, filed on Jun. 24, 2021.

(51) Int. Cl.
| | |
|---|---|
| *G06Q 20/00* | (2012.01) |
| *G06Q 20/38* | (2012.01) |
| *G06Q 20/40* | (2012.01) |

(52) U.S. Cl.
CPC ... *G06Q 20/38215* (2013.01); *G06Q 20/3827* (2013.01); *G06Q 20/4014* (2013.01); *G06Q 20/4015* (2020.05)

(58) Field of Classification Search
CPC ......... G06Q 20/38215; G06Q 20/3827; G06Q 20/4014; G06Q 20/4015
USPC ................. 705/16, 21, 59; 380/44, 262, 278
See application file for complete search history.

(56) References Cited

FOREIGN PATENT DOCUMENTS

KR   20110104524 A   *   9/2011   .........   H04L 12/2801

OTHER PUBLICATIONS

Barr David Foriegn Reference (Year: 2008).*
May Thura Lwin, Jinhyuk Yim and Young-Bae Ko, Blockchain-Based Lightweight Trust Management in Mobile Ad-Hoc Networks, open access article, Jan. 27, 2020, pp. 1-19, MDPI, Basel, Switzerland.
Rafael Belchior, Benedikt Putzy, Guenther Pernuly, Miguel Correia, Andre Vasconcelos and Sergio Guerreiro, SSIBAC: Self-Sovereign Identity Based Access Control, scholarly paper, Feb. 9, 2021, pp. 1-9, IEEE, New York, United States.
Kaliya Young, Verifiable Credentials Flavors Explained, technical article, date unknown, pp. 1-21, The Linux Foundation, San Francisco, United States.
Tykn, Blockchain Identity Management: The Definitive Guide (2021 Update), Internet article, May 19, 2021, https://tykn.tech/identity-management-blockchain/.
Tyler Ruff, Verifiable Credentials 101 for SSI with Tyler Ruff—Decentralized Digital Identity, Youtube video, Sep. 18, 2018, https://www.youtube.com/watch?v=6O_iJnhlh5o.

* cited by examiner

*Primary Examiner* — Dante Ravetti
(74) *Attorney, Agent, or Firm* — Thibault Patent Group

(57) ABSTRACT

A system, method and apparatus for resource access control. An authorization record is created when a requestor has been authorized to access a resource, the authorization record created from an authorization event template stored on an authorization blockchain network. The authorization resource comprises one or more conditions that must generally be true in order for the user to access the resource. The authorization record may additionally comprise one or more permissions for the user to manage the resource.

7 Claims, 5 Drawing Sheets

```
1   {
2     "@context": [
3       "https://www.w3.org/2018/credentials/v1",
4       "https://ares.beyondaerospace.com/2021/credentials/aae/v1"
5     ],
6     "id": "http://ares-customer.com/credentials/3732",
7     "type": ["VerifiableCredential", "AAECredential"],
8     "issuer": "https://ares-customer.com/issuers/18",
9     "issuanceDate": "2021-04-18T19:23:24Z",
10    "expirationDate": "2021-04-18T19:24:24Z",
11    "credentialSubject": {
12        "id": "did:hyperdrive.ares-customer.com:ebfeb1f712ebc6f1c276e12ec21",
13        "access": {[{"read": ["screen-presence"]},
14                    {"store": ["ram", "disk-encrypted"]}
15        ]},
16    "pkNonce": "8eGWSiTiWtEA8WnBwX4T259STpxpRKuk...kpFnikqqSP3GMW7mVxC4chxFhVs"
17  } ,
18    "proof": { ... }
19  }
```

SYSTEM, METHOD AND APPARATUS FOR RESOURCE ACCESS CONTROL

CROSS-REFERENCE TO RELATED APPLICATIONS

This application claims the benefit of U.S. provisional patent application 63/214,326, filed on Jun. 24, 2021.

BACKGROUND

Field of Use

The present invention relates to the field of blockchain technology and more specifically to a system, method and apparatus for controlling access to digital resources in a networked environment.

Description of the Related Art

Blockchain technology has exploded into the mainstream recently, underlying the technology of cryptocurrencies. Blockchain technology utilizes encrypted, distributed, digital ledgers that describe digital transactions that occur between two or more entities over the Internet. Multiple "nodes" in a network keep a copy of the distributed ledger, and when a digital transaction occurs, each node, or a majority of nodes, in the network attempts to validate the transaction. When the transaction is validated by each of the validating nodes, it sends proof of the validation to the other nodes. Once a majority of the nodes agree that the proof is valid, the transaction is added to a plurality of other validated transactions, and a new "block" is written to the distributed ledger and updated on all of the nodes.

While blockchain technology is well-known, used as the technological backbone of digital cryptocurrencies, it may be used in other applications, such as voting, identification, data management and distribution, data storage, and many others.

One drawback of currently deployed resource access control systems is that a single entity is often charged with important transaction processing. For example, in the case of data management and distribution, a user may wish to access a file stored in a database. Access to the database may be managed by a single entity, such as a computer server or "node" that is programmed to authenticate and authorize the user for access to the database. While identification may be performed using known tokens (i.e., username/password combinations) or by using blockchain techniques, such as the use of distributed identities, authorization by the computer server holding the data typically comprises an evaluation by the computer server only, i.e., the computer server may evaluate whether the user has provided a proper username and matching password and is listed as an authorized person against a list of authorized persons stored by the computer server. This single point of authorization may be compromised by another computer server intercepting communications between the user and the computer server (a "man in the middle" attack), or by an malicious user with broad access rights (an "insider attack").

Another problem with traditional authorization schemes is that they frequently only authorize users at a certain level. In the example above, authorization is described in terms of a general authorization to access every file in the database, or a broad subset, at any time of day, using any type of device, on any local-area network. There may be instances where an administrator may want to customize access for each file in the database so that only authorized persons, given other constraints, can access particular files, and any subsequent access can be uniquely identified and memorialized.

Yet another problem with traditional authorization schemes is that they do not establish conditions under which a user may access a resource. For example, it may be desirable to only allow a user to access a resource at certain times of the day, in certain locations, when connected to only permitted local and/or wide-area networks, when the user is actually looking at a display screen of a device displaying the resource.

Thus, it would be desirable to authorize access to particular resources, such as computer files, physical entities, etc., in a distributed fashion and enable more comprehensive descriptions of the possible contexts within which such access may be granted.

SUMMARY

The embodiments herein describe systems, methods and apparatus for providing access to a resource. In one embodiment, a method is described, performed by various computing nodes of a resource access system, comprising creating, by a first computing node, an authorization event template comprising at least one constraint for accessing the resource, submitting, by the first computing node, the authorization event template to an authorization blockchain network, receiving, by a second computing node from a third computing node, a request to access the resource by a requestor, verifying that the requestor has permission to access the resource, and when the requestor has permission to access the resource, generate an authorization record based on the authorization event template and an identity of the requestor, the authorization record comprising the at least one constraint, wherein access to the resource is granted when the at least one constraint listed in the authorization record is satisfied.

In another embodiment, a resource access system is described for authorizing access to a resource, comprising a first computing node for generating an authorization event template comprising at least one constraint for accessing the resource, an authorization blockchain network for storing the authorization event template, a second computing node for receiving a request to access the resource from a requestor via a third computing node, for verifying that the requestor has permission to access the resource, and for generating an authorization record when the requestor is determined to have permission to access the resource, the authorization record based on the authorization event template and an identity of the requestor, the authorization record comprising the at least one constraint for accessing the resource, and the third computing node for receiving the authorization record and for determining whether the at least one constraint is being satisfied, wherein the third computing node provides the resource to the requestor only when the at least one constraint is being satisfied.

In yet another embodiment, a user device is described for providing access to a resource for a user of the user device, comprising, a user interface, an information storage device for storing processor-executable instructions and an authorization record, a network interface and a processor coupled to the user interface, the information storage device and the network interface, for executing the processor-executable instructions that causes the user device to receive, by the processor via the network interface, an authorization record stored on an authorization blockchain network, the authorization record comprising at least one constraint for accessing the resource, determine, by the processor, that the at least one constraint is satisfied, and provide, by the processor via the user interface, access to the resource when the at least one constraint is satisfied.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 4 is one embodiment of an authorization event template used in the resource access system shown in FIG. 1.

DETAILED DESCRIPTION

Systems, methods and apparatus are described for authorizing access to resources using distributed ledger technology. An issuing entity generates an authorization event template associated with a resource in control of the issuer and posts it to an authorization blockchain network. The authorization event template comprises one or more conditions under which a resource may be accessed and may additionally comprise one or more permissions that prescribe how the resource may be managed. Traditional access control techniques may be used to determine if a requesting entity is authorized to access the resource and, if so, an authorization record is created based on the authorization event template and an identity of the requesting entity. If all of the conditions listed in the authorization record are satisfied, the requesting entity is granted access to the resource. A "resource", as used herein, comprises any digital computer file in any form, such as a clear or encrypted pdf file, word file, digital photograph or video and audio recordings and real-time transmissions, meta-data pertaining to the resource, an executable file, account information, access to a remotely-executed software application, a stream of data, access to physical objects (i.e., an ability to issue commands or receive data) such as network-connected automobiles, aerial or underwater drones, rockets, military vehicles such as tanks, helicopters, armored personal carriers, submarines, etc. A resource may be stored in a single database or distributed on a network of computers, such as a peer-to-peer network or on a blockchain network.

Figure 1:
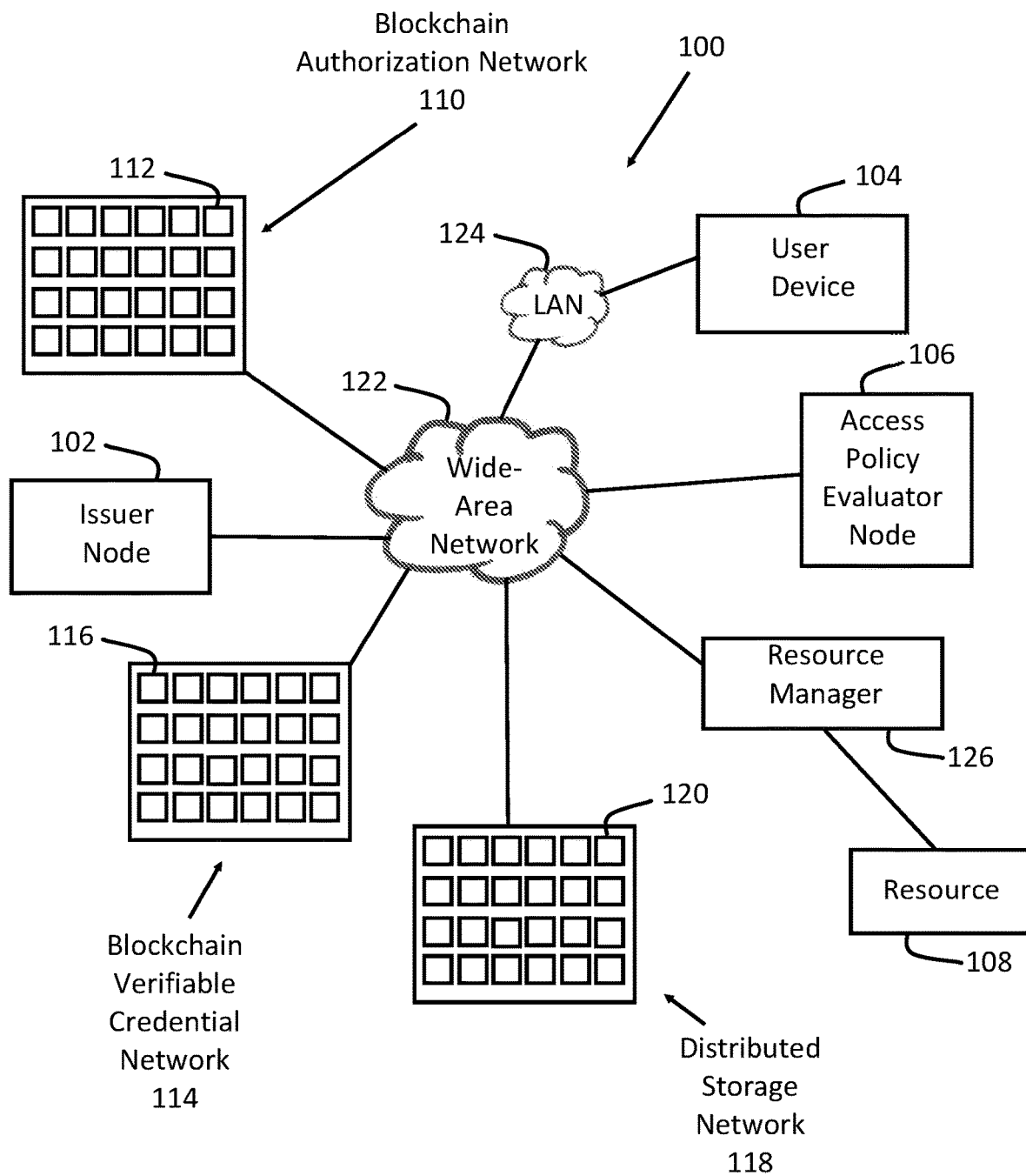
FIG. 1 is a functional block diagram of one embodiment of a resource access system.

FIG. 1 is a functional block diagram of one embodiment of a distributed resource access system 100. Shown is an issuer node 102, a user device 104, an access policy evaluation node 106, a resource 108, a blockchain authorization network 110 comprising a plurality of authorization nodes 112, a blockchain credential verification network 114 comprising a plurality of credential verification nodes 116, a distributed storage network 118 comprising a plurality of storage nodes 120, a wide-area network 122, a local-area network (LAN) 124 and a resource manager 126 A user may access resource 108 by using user device 104. User device 104 is typically a network-capable computer (such as a laptop or desktop computer, tablet, etc.), a computer-equipped vehicle such as a car, boat, airplane, helicopter, etc. or a personal mobile communication device (such as a cellular or satellite phone, wearable device, etc.). It should be understood that issuer node 102, user device 104, access policy evaluation node 106, resource 108, authorization nodes 112, and storage nodes 120 may each be referred to herein as a "computing node".

As mentioned above, resource 108 may comprise one of a variety of network-accessible clear or encrypted digital files, remote software applications, clear or encrypted digital information streams, clear or encrypted digital control streams, etc. In some embodiments, access to resource 108 is controlled resource manager 126, which comprises a node such as a computer server that receives requests for resources, evaluates the requests, and provides access to the resources if one or more conditions are satisfied, as will be explained in greater detail below.

Resource 108 may be stored by a single entity, for example, a digital file stored in a single database, or a communication link to a remote vehicle, or, in the case of a digital file, resource 108 may be stored across a distributed storage system such as distributed storage network 118. Distributed storage network 118 may comprise a peer-to-peer network or a blockchain network comprising a plurality of storage nodes. In the case of a blockchain network, each storage node 120 stores an encrypted copy of either a portion or an entire digital file(s) provided by resource 108, and tracks attributes of such files, such as a data and time of creation, modification or storage, an origination identifier describing a resource that generated the file(s), etc. Generally, when a majority of storage nodes 120 agree that valid data has been provided by resource 108, an immutable, linked, cryptographic "block" of data is produced and added to a chain of pre-existing blocks to form a blockchain. A storage node 120 may include the valid data directly in the cryptographic "block", or maintain separate "blocks" whereby one "block" contains the valid data's meta-data and cryptographic signature, and another "block" the actual valid data. The "blocks" may reside on the same blockchain, or on two distinct blockchains.

It should be understood that although only one authorization node 112, one credential verification node 116 and one storage node 120 is referenced in blockchain authorization network 110, blockchain credential verification network 114 and distributed storage network 118, respectfully, and that each network is shown having 24 nodes, in practice, a large number of nodes are used for each network, typically in the thousands or even millions.

A "node" or "computing node", as used herein, comprises a networked computing device, for example a computer server or a smart mobile capable of communicating digitally with other nodes via wide-area network 122 and/or a local-area network (LAN) 124. Such computer servers may be hosted in a traditional data center or be part of an embedded edge computing device. Wide-area network 122 comprises a plurality of routing nodes that route signals typically over great distances and among the various nodes of each network, typically comprising the Internet. LAN 124 comprises a computer network that interconnects computers within a limited geographic area, such as a home, a school, an office, etc. A typical example of LAN 124 comprises a Wi-Fi modem/router combination.

Issuer node 102 is responsible for creating an "authorization event template" for each resource to be accessed by users of resource access system 100 and for distributing the authorization event template to all nodes 112 of blockchain authorization network 110. The authorization event template defines "conditions" under which a user may access a particular resource and, in some embodiments, "permissions" that specify how the resource may be managed, i.e., whether a document can be printed, whether the document can be shared with others, etc. The authorization event template typically comprises a unique resource identifier that uniquely identifies the resource in resource access system 100, and one or more conditions that must be true in order for a user(s) to access the resource and, in some embodiments, one or more permissions.

The "conditions" comprise one or more constructs that generally must be true in order for an authorized user to actually access the resource. For example, in a highly classified setting, a user may request an encrypted document from a government database. An authorization event template may have been pre-issued and stored across all nodes 112 of blockchain authorization network 110 in association with the particular encrypted document, the authorization even template comprising one or more conditions in order for the user to view the document. For example, the requested document may have three conditions attached to it, and all three must be true in order for the user to view the document on a screen of user device 104: (1) that user device 104 is a device authorized by the government to view the document, (2) that the user is actually looking at the display screen of user device 104, and (3) user device 104 is accessing the document via an authorized local-area network (i.e., a secure LAN within a particular government office building, for example).

When a user wishes to access a resource using user device 104, the user enters a request into user device 104 to access the resource. The request may comprise a resource identifier that uniquely identifies the resource, and one or more credentials that allow a verifying entity, such as access policy evaluator node 106, to verify that the user is authorized to access the resource. In this example, the request is sent by user device 104 to access policy evaluator node 106 via LAN 124 and wide-area network 122.

When the request is received by access policy evaluator node 106, access policy evaluator node 106 may authenticate the request to determine if it actually originated from the person who purportedly sent the request. Well-known public key encryption techniques may be used to authenticate the user, using a private/public key combination. Once the user is authenticated, access policy evaluator node 106 determines whether the user is authorized to access the resource. This may be accomplished using a number of different techniques, described later herein.

If the user is authenticated and authorized to access the document, access policy evaluator node 106 retrieves the authorization event template stored on blockchain authorization network 110 using the resource ID of the requested resource, and creates an authorization record based on the authorization event template, an identity of the user requesting access to the resource, the resource ID and in some embodiments, a signed token that is used by a user to access a resource. The authorization record contains all of the conditions and permissions that pertain to accessing and managing the resource. The authorization record is stored across all of the nodes 112 of the authorization blockchain network 110 as a verified transaction in accordance with well-known blockchain protocols.

Once the authorization record has been created, access policy evaluator node 106 obtains the a network address, such as a URL, to the resource either directly from resource 108 or from distributed storage network 118, and then provides the authorization record to user device 104. User device 104 then uses the URL to retrieve the resource itself. Alternatively, access policy evaluator node 106 may package the authorization record directly together with the resource. In either case a dedicated encryption key may be applied to the resource for each URL-based or directly packaged access. User device 104 then determines whether the conditions to access the resource are currently being satisfied, such as determining whether user device 104 is authorized to access the resource, determining whether the user is currently looking at a display screen of user device 104, determining an IP address assigned to user device 104 (for purposes of determining whether user device 104 is operating in an authorized local-area network), etc. If all of the conditions listed in the authorization record are satisfied, the resource is provided to the user, i.e., decrypted and displayed on a display screen of user device 104 or otherwise presented in a format that the user may view or hear. If not, the resource is not provided to the user, i.e., not shown on a display screen, not decrypted, etc. If the user wishes to manage the resource, for example, wishes to print a document, store a document on a hard drive or on a removable memory device, play an audio file or audio stream through an audio speaker, display a file or streaming video visually on a display screen or wearable display, etc., user device 104 determines whether the user has permission to do so, based on the authorization record stored in user device 104. If so, user device 104 allows the user to manage the resource. If not, the user is denied permission.

User device 104 may continue to determine whether all of the conditions specified in the authorization record are being satisfied on an ongoing-basis. Generally, if at any time at least one of the conditions are not presently being satisfied, user device 104 may deny further access to the resource, i.e., cease displaying a document, cease streaming audio to a speaker of user device 104, re-encrypt a documents, etc.

Figure 2:
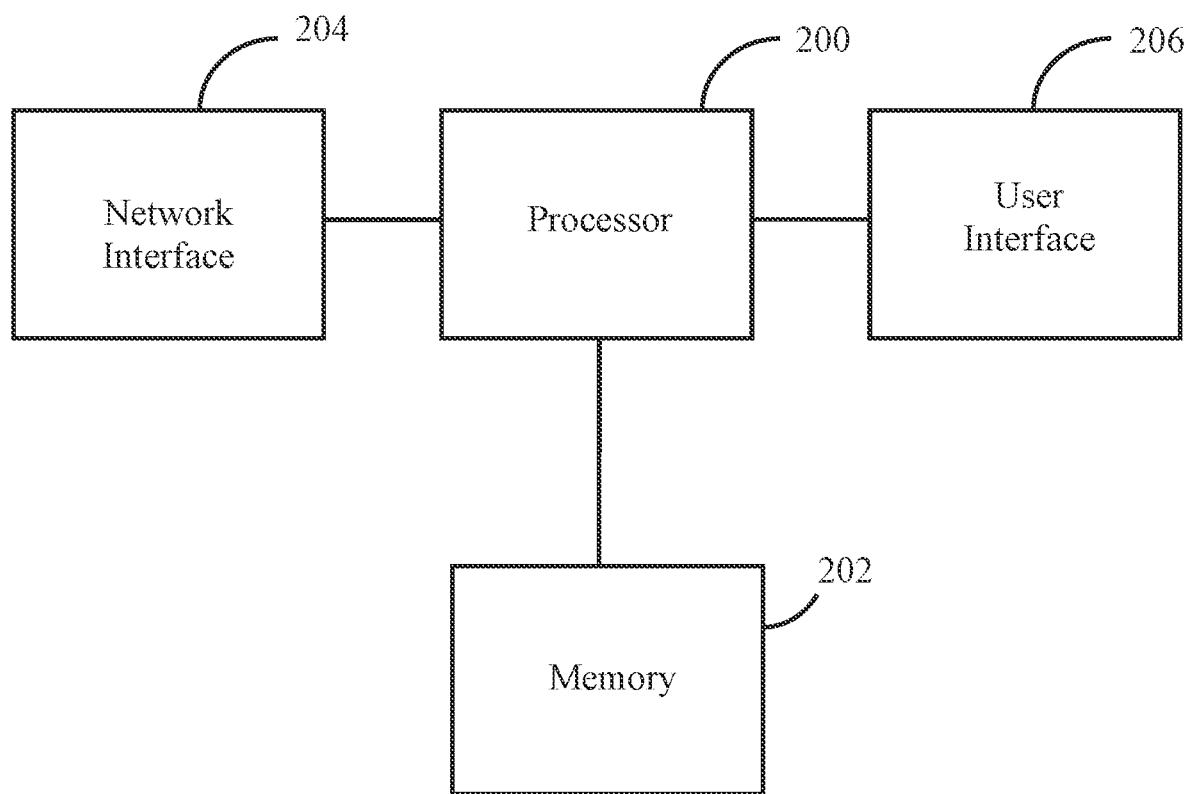
FIG. 2 is a simplified functional block diagram of any of the nodes shown in FIG. 1.

FIG. 2 is a simplified functional block diagram of any of the nodes shown in FIG. 1, comprising processor 200, information storage device 202, network interface 204 and user interface 206 (in some cases).

Processor 200 is configured to provide general operation of each node by executing processor-executable instructions stored in information storage device 202, for example, executable computer code. Processor 200 typically comprises one or more general or specialized microprocessors, microcontrollers, and/or customized ASICs, selected based on computational speed, cost, power consumption, and other factors relevant to each node.

Information storage device 202 is coupled to processor 200 and comprises one or more non-transitory information storage devices, such as static and/or dynamic RAM, ROM, flash memory, or some other type of electronic, optical, or mechanical memory device. Information storage device 202 is used to store processor-executable instructions for operation of each node, respectively. It should be understood that in some embodiments, a portion of information storage device 202 may be embedded into processor 200 and, further, that information storage device 202 excludes propagating signals.

Network interface 204 is coupled to processor 200, comprising circuitry for sending and receiving packetized data to/from other nodes in resource access system 100 via wide-area network 122 and local-area network 124.

User interface 206 is coupled to processor 200 and allows a user to "consume" resources, i.e., to view or listen to resources, and enter various commands, such as control commands to operate a remote, aerial drone, and requests to manage resources, such as requests to print, edit, forward, display, play, render or decrypt resources. User interface 206 may comprise one or more pushbuttons, touchscreen devices, biometric readers, switches, sensors, keypads, and/or microphones that generate electronic signals for use by processor 200 upon initiation by a user. User interface 206 may alternatively, or additionally, comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of resources to a user.

Figure 3A:
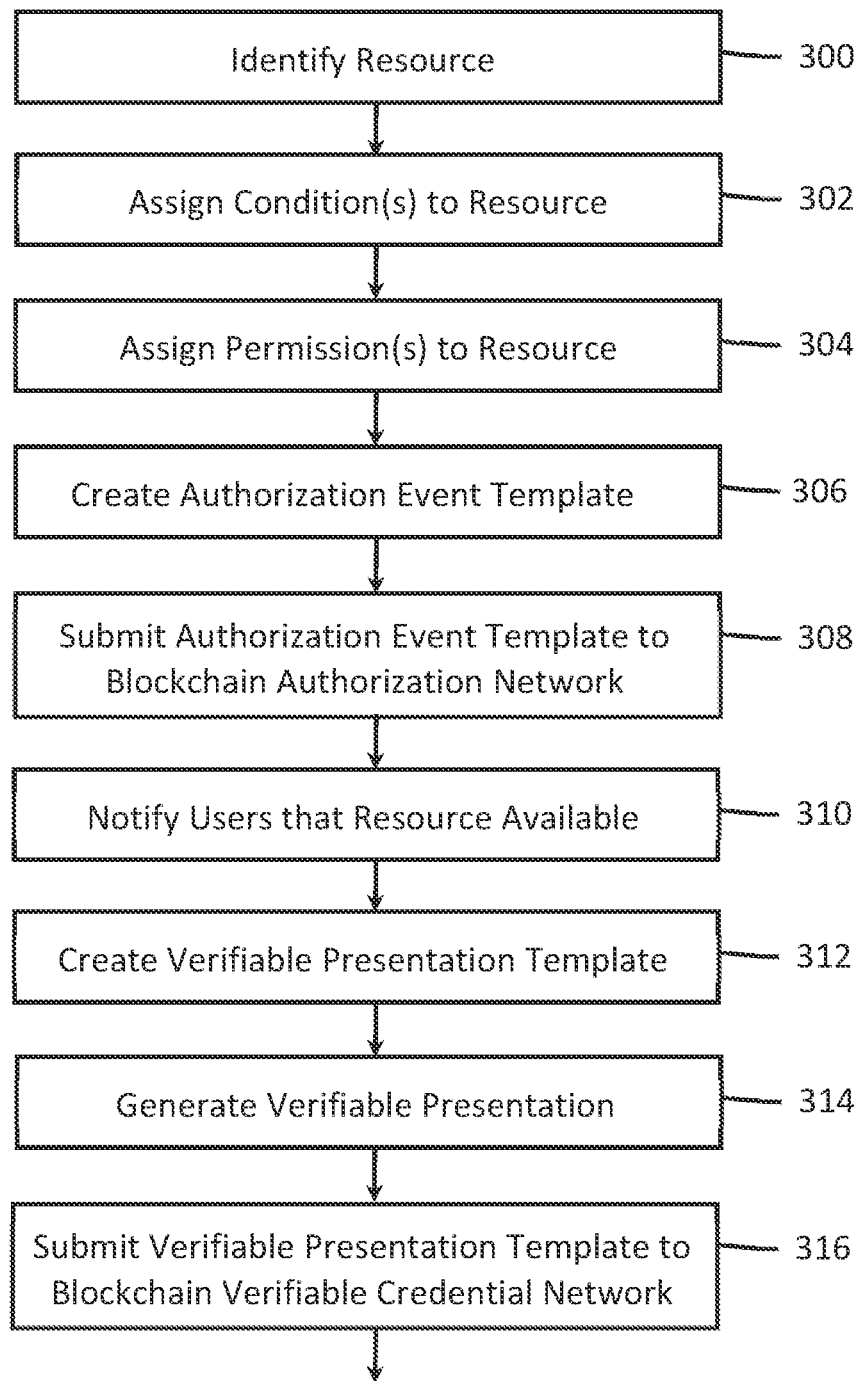
FIGS. 3A and 3B represent a flow diagram illustrating one embodiment of a method, performed by the nodes of the resource access system shown in FIG. 1, for accessing a resource using conditions defined by an authorization record stored on an authorization blockchain network as shown in FIG. 1.
Figure 3B:
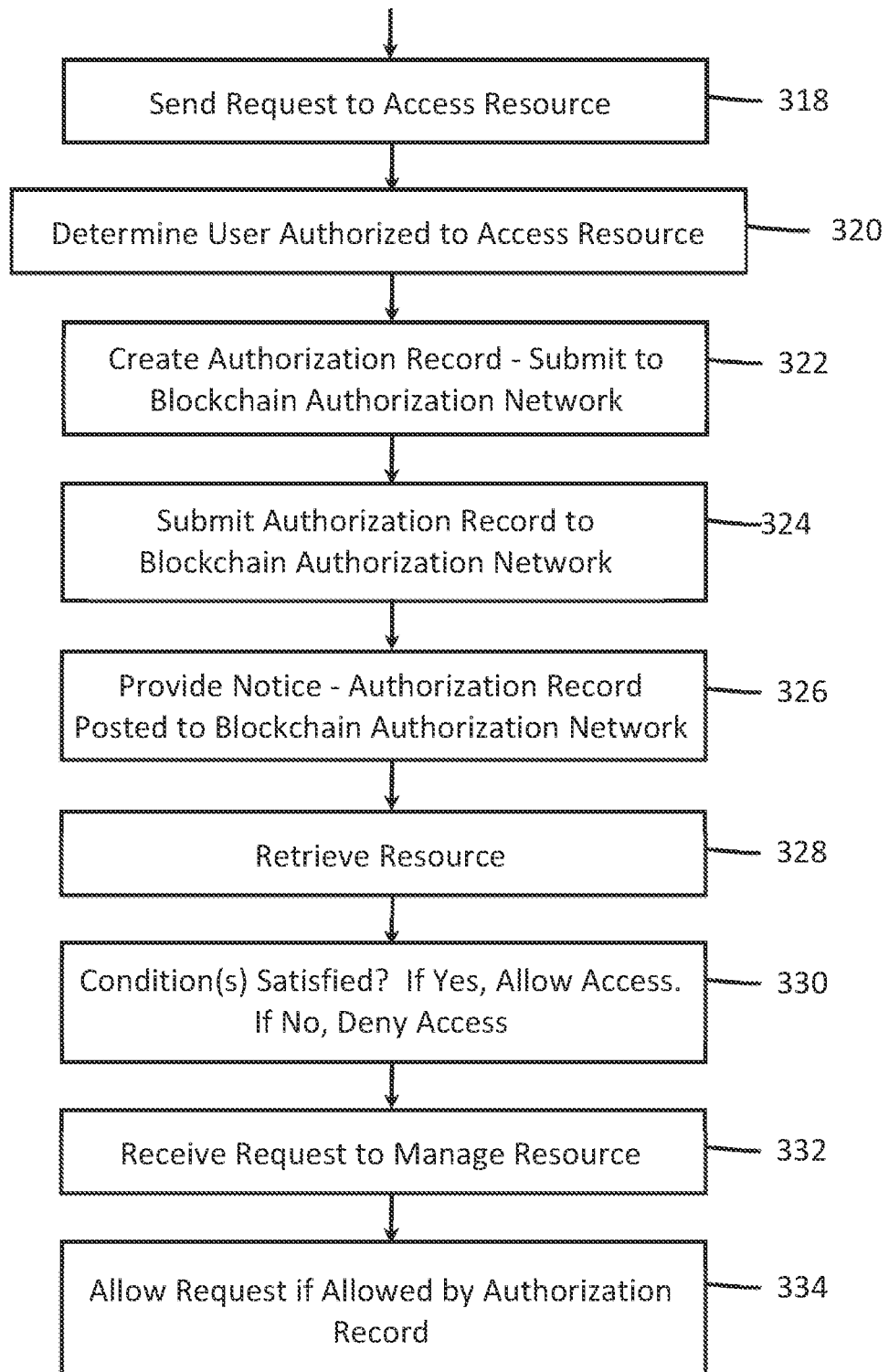

FIG. 3 is a flow diagram illustrating one embodiment of a method, performed by one or more nodes of resource access system 100, for accessing a resource using conditions defined by an authorization record stored on blockchain authorization network 110 stored on authorization blockchain network 110. More specifically, the method describes operations performed by processor 200 in each node, each executing processor-executable instructions stored in a respective information storage device 202. It should be understood that in some embodiments, not all of the steps shown in FIG. 3 are performed, and that the order in which the steps are carried out may be different in other embodiments. It should be further understood that some minor method steps have been omitted for purposes of clarity.

At block 300, a resource is identified by an "issuer entity", such as a government agency, a health care provider, an insurance company, or some other organization in control of one or more resources. For example, resource 108 may comprise a series of digital photographs or videos, a classified document, a data stream from an aerial drone, etc. Resource 108, in whatever form, may be provided to distributed storage network 118, where it is stored in a plurality of storage nodes 120 in accordance with well-known distributed ledger technology. Generally, the issuer entity is notified after the resource becomes available if the issuer entity did not create the resource. The resource may be assigned a distributed identifier or "DID", which is a unique, cryptographically verifiable, machine-readable code for uniquely identifying the resource in resource access system 100.

At block 302, after the issuer entity is notified of the existence of the resource, and in one embodiment, the DID assigned to the resource, the issuer entity may assign one or more conditions to the resource. For example, the one or more conditions may dictate that user device 104 access the resource over a private satellite communication network only, that user device 104 accesses the file over a public communication network such as a cellular network, a non-secure public satellite communication network, the Internet, etc., that user device 104 is in a pre-authorized location (such as a private vs a public place), that a software application for viewing/accessing the file is open, that an expiration time to access the file has not expired, etc. A non-exhaustive listing of conditions that could be imposed on the resource comprise the following:

Access to a physical file storage ledger (such as distributed storage network 118):
  Access confined to file/directory listings
  Access confined to specific files
  Access confined to encrypted file data
  Access confined to re-encrypted file data with an on-demand key
  Access confined to clear file data
  Transfer of the data
  Access confined to one or more local secure private networks (physically separated)
  Access confined to one or more local secure private networks (logically separated via encryption)
  Access confined to one or more wide-area secure private networks (physically separated)
  Access confined to one or more wide-area secure private networks (logically separated via encryption)
  Access confined to one or more virtual private networks over non-trusted public network
  Access confined to one or more network paths (routing) w/o DNS or routing lookups (no digital footprint on $3^{rd}$ party services)
  Access confined to one or more time windows
  Access confined to any of the above in conjunction with noise traffic generation, i.e., a purposefully-generated noise floor of useless encrypted data being exchanged ongoingly, so that the real access is not obvious to an observer of the encrypted traffic stream
  Access confined to any of the above with transmission regulated to sparse bursts, randomized bursts, or continuous bandwidth-regulated transmission, i.e., the timing of transmissions may be prescribed by underlying link capabilities and noise characteristics Consumption of the data (i.e., by user device 104):
  One or more identifications of devices authorized to receive and manage a resource
  One or more identifications of operating systems authorized to run an app for accessing the resource
  One or more identifications of a level of sandboxing of a consuming application (i.e., one or more operating systems such as Windows or Linux/Mac, one or more browser/web apps, one or more authorized device types, i.e., iOS device, Android device, one or more dedicated virtual machines/dockers to run an app, one or more dedicated hardware nodes to run an app)
  One or more identifications of ways to handle data decryption keys (i.e., dedicated secure elements (with specific Common Criteria level), a virtual SE/ARM TrustZone, a dedicated processor, logically or physically separated secure memory)
  User modalities
  User auth required (level, how recent, single or two-factor auth, CAC auth (common access card) or other smart card required)
  User location (defined by geofence or class of location, e.g. office, home, personal vehicle, public transport, public area)
  Time of day windows
  User presence (fingerprint every x seconds, face recognition every x seconds, face recognition in conjunctions with continuous video tracking or other gaze detection)
  User device handling (motion sensors to discern holding user device 104 vs lying e.g. on a table or in a bag)

At block 304, the issuing entity may assign one or more permissions to the resource, such as whether the user may print a document, whether a user may forward a file to another entity, whether a file can be copied to a physical storage device such as a hard drive, external storage device, removable storage device, whether a document may be converted into another format, such as from Word to a PDF document, whether the resource may be handled by a synchronization service (e.g. iCloud), whether the user may edit a document, whether the user may play an audio file or audio stream through an audio speaker, whether the user may display a file or streaming video visually on a display screen or wearable display, etc.

At block 306, the issuing entity causes an authorization event template to be created in association with the resource. The authorization event template comprises an identification of the resource and an address where the resource may be accessed (i.e., a URL), an identification of one or more users/entities that are authorized to access the resource (in one embodiment, a "realm" is listed, the realm associated with a "tails file" on a distributed identifier (DID) blockchain network in an embodiment where users are grouped into organizations/domains/realms. Each realm has an associated tails file stored on the DID blockchain network that associates users and the resources they can access. In this embodiment, the authorization event template specifies which realms' tails files access policy evaluator node 106 should consider when checking whether a user has access to a resource. While a "tails file" is specific to the Hyperledger Indy implementation, DID chains use signed relationship tables that associate user and resource DIDs.), a signed token that is used to access the resource by a requesting entity (such as a person, computer, robot, drone, etc.), the one or more conditions, and in some embodiments, the one or more permissions. The authorization event template may additionally comprise an identification of the issuing entity, an issuance date of the authorization event template, and an expiration date of the authorization event template (i.e., a time/date when the resource may no longer be accessed).

An example of an authorization event template is shown in FIG. 4, which is typically written in a programming and data templating language specific to a blockchain's chain code such as Python, Java, Go, JSON, XML or similar, where line 8 identifies the issuing entity, line 9 identifies an issuance date, line 10 identifies an expiration date of the authorization event template, line 12 identifies the resource (in one embodiment, a DID of the resource), and lines 13-15 lists the conditions and permissions that must be true in order for the entity to access and manage the resource. In this example, in order to access the resource located at "http://ares-customer.com/credentials/3732", a user must be looking at a display screen of user device 104 and the resource may be stored in RAM memory of user device 104 as well as on a hard drive of user device 104 so long as it is encrypted. Line 16 identifies the signed token used to access the resource, as described later herein, identified as "pkNonce".

At block 308, after the authorization event template has been created, the issuing entity submits the authorization event template to one of the nodes 112 of blockchain authorization network 110 via issuer node 102, where it is then provided by node 112 to all of the other nodes 112 of blockchain authorization network 110 in accordance with well-known blockchain protocols. Thus, the authorization event template is stored in a distributed fashion in blockchain authorization network 110 and publicly accessible by any node in resource access system 100.

At block 310, the issuer entity may notify one or more users that a resource associated with the newly-created authorization event template is available by sending a message via wide-area network 122, local-area network 124 to user device 104.

At block 312, the issuer entity may create a verifiable credential template comprising one or more schema, a public key used to identify the issuer entity, and an identification of the verifiable credential template. Verifiable credentials are described by the World Wide Web Consortium ("W3C") (www.w3.org), an international standards organization based in Cambridge Mass.

For example, the schema may comprise one or more fields arranged in accordance with the well-known Indy Anoncreds Specification, JSON Web Tokens, JSON-LD, or some other well-known schema arrangement. For example, the schema may comprise fields for a user name, a clearance level, and a field for a photograph of a user. The public key is part of a private/public key pair generated by the issuer entity used by other nodes in resource access system 100 to verify that the issuer entity is the one who has issued a verifiable credential to a user, and the identity of the verifiable credential template may comprise a distributed identifier, which is a unique alpha-numeric code assigned by the issuer entity that uniquely identifies the verifiable credential template. Distributed identifiers are well known in the art.

At block 314, after the verifiable credential template has been created, the issuing entity submits the verifiable credential template to one of the nodes 116 of blockchain verifiable credential network 114 via issuer node 102, where it is then provided by node 116 to all of the other nodes 116 of verifiable credential network 114 in accordance with well-known blockchain protocols. Thus, the verifiable credential template is stored in a distributed fashion in verifiable credential network 114 and publicly accessible by any node in resource access system 100.

At block 316 the issuer entity may generate a verifiable credential each for one or more users based on the authorization event template and particulars of each user, respectively. For example, the issuer entity may generate a verifiable credential naming John Smith as a user, that John Smith possesses a top-secret security clearance, and a photograph of John Smith. The issuer entity cryptographically signs the verifiable credential with a private key of the issuer's DID and then provides the signed, verifiable credential it to John Smith via wide-area network 122, local-area network 124 (if applicable) and user device 104 where it is stored in memory 202, providing protection against a 3rd party accessing and using the signed, verifiable credential.

At block 318, the issuer entity may create a verifiable presentation template comprising one or more schema, a public key used to identify the issuer entity, and an identification of the subject of the verifiable presentation. In one embodiment, the subject of the verifiable presentation template is the decentralized identity (DID) of the resource, and the verifiable presentation template contents comprise the attributes required by access evaluator 106 to authorize access of the resource to an entity. Verifiable presentations are described by the World Wide Web Consortium ("W3C") (www.w3.org), an international standards organization based in Cambridge Mass.

For example, the verifiable presentation may comprise one or more fields arranged in accordance with the well-known Indy Anoncreds Specification, JSON Web Tokens, JSON-LD, or some other well-known schema arrangement. For example, the verifiable presentation may comprise fields for a user name, a clearance level, and a field for a photograph of a user. The public key is part of a private/public key pair generated by the issuer entity used by other nodes in resource access system 100 to verify that the issuer entity is the one who has issued a verifiable credential to a user which is in turn used to create a verifiable presentation, and the identity of the verifiable presentation subject may comprise a distributed identifier, which is a unique machine-readable and cryptographically verifiable code assigned by the issuer entity that uniquely identifies the verifiable credential subject. Distributed identifiers are well known in the art.

At block 320, after the verifiable presentation template has been created for the resource, the issuing entity submits the verifiable presentation template to one of the nodes 116 of blockchain verifiable credential network 114 via issuer node 102, where it is then provided by node 116 to all of the other nodes 116 of verifiable credential network 114 in accordance with well-known blockchain protocols. Thus, the verifiable presentation template for the resource is stored in a distributed fashion in verifiable credential network 114 and publicly accessible by any node in resource access system 100.

At block 322, the issuer entity may notify one or more users of the existence of the newly-created verifiable presentation template in association with the resource by sending a message via wide-area network 122, local-area network 124 to user device 104.

At block 324 the issuer entity may generate a verifiable credential each for one or more users based on the verifiable credential template and particulars of each user, respectively. For example, the issuer entity may generate a verifiable credential naming John Smith as a user, that John Smith possesses a top-secret security clearance, and a photograph of John Smith. The issuer entity cryptographically signs the verifiable credential with a private key of the issuer's DID and then provides the signed, verifiable credential it to John Smith via wide-area network 122, local-area network 124 (if applicable) and user device 104 where it is stored in memory 202, providing protection against a 3rd party accessing and using the signed, verifiable credential.

At block 326, a user of requesting entity, such as a user of user device 104, a node, etc., requests access to the resource by sending a request to access policy evaluator node 106 via local-area network 124 (if applicable) and wide-area network 122. The request comprises an identification of the requested resource, in one embodiment a DID of the resource, an identity of the user (which may also be a DID assigned to the user), and the verifiable credential of the user. Access policy evaluator node 106 responds with the applicable verifiable presentation template for accessing the resource by this user. Alternatively, the request for access to the resource directly contains the user's verifiable presentation specific to accessing this resource if the required verifiable presentation template is known to the requestor a priori by other means. The verifiable presentation comprises the required attributes from the user's verifiable credential as defined in the resource-specific verifiable presentation template. Verifiable presentations are well-known in the art for allowing nodes such as access policy evaluator node 106 to verify that a requesting entity is authorized to access a requested resource. In this case, the verifiable presentation is created by retrieving the verifiable presentation template stored on blockchain authentication network 110 associated with the requested resource and, based on that template, generate the concrete verifiable presentation, which comprises one or more of the schema data associated with the user, i.e., the user's name, security clearance level, photograph, etc.).

At block 328 access policy evaluator node 106 performs an authorization technique to determine if the user is authorized to access the resource.

A typical authorization technique is to compare a username and password to a list stored by access policy evaluator node 106, to see if the user entered a correct password that matches the user's username. Another well-known technique is to require the user to provide a digital finger print, retinal scan, voice scan, three-dimensional facial recognition, or some other biometric information to user device 104, for user device 104 to match the biometric information to pre-stored biometric information in user device 104. If a match if found, user device 104 may use cryptographic keys (typically asymmetric ones) to generate a token that represents an authorized session, and provide the token to access policy evaluator node 106. However, these prior-art techniques are subject to hacking and data loss, as usernames, passwords, and similar credentials are typically stored on a single server that may be vulnerable to cyber criminals and insider attacks.

However, recent techniques based on blockchain technology have been developed that encrypt such authorization information and allow it to be stored on a distributed ledger, rather than stored and controlled on a server operated by a verifying entity, such access policy evaluator node 106. In this embodiment, the user is authorized using one or more verifiable credentials from a verifiable credentials ledger.

In an embodiment using verifiable credentials, when access policy evaluator node 106 receives the request from the user to access the resource, access policy evaluator node 106 looks up the verifiable presentation template associated with the requested resource on blockchain verifiable credential network 114 and determines that in order to access the requested resource, a user must possess a top-secret security clearance issued by the United States government. Access policy evaluator node 106 can cryptographically determine that the user that requested the resource does, in fact, possess a top-secret clearance based on the information contained in the verifiable presentation template associated with the requested resource using techniques well-known in the art.

In any case, at block 330, after access policy evaluator node 106 determines that the requesting user is authorized to access the resource, access policy evaluator node 106 causes an authorization record to be created based on the authorization event template previously posted to authorization blockchain network 110 in block 308 and an identity of the user requesting access to the resource. The authorization event template is identified by access policy evaluator node 106 on blockchain authorization network using the unique identifier assigned to the resource. The authorization record contains an identification of the resource, an identification of the requestor, all of the conditions and permissions that pertain to accessing and managing the resource, and a signed token for use by the requestor to access the resource for validating the authorization record by nodes 112 of blockchain authorization network 110. The authorization record is then submitted to all of the nodes 112 of the authorization blockchain network 110 after a majority of nodes 112 verify the authorization record in accordance with well-known blockchain protocols.

At block 332, after the authorization record has been posted to authorization blockchain network 110, one of the nodes 112 may provide feedback to access policy evaluator node 106 indicating that the authorization record has been posted as a block of a blockchain managed by authorization blockchain network 110, as well as the authorization record itself.

At block 334, access policy evaluator node 106 may retrieve the resource either directly from resource 108 or from distributed storage network 118. In another embodiment, the resource is referenced by a network address, such as a URL, listed in the authorization record. Access policy evaluator node 106 may also retrieve the authorization record from authorization blockchain network 110.

At block 336, access policy evaluator node 106 provides the authorization record and in some embodiments, the resource, to user device 104 via wide-area network 122 and local-network 124. The resource may be provided as-is, or protected for this access with additional cryptographic methods for data confidentiality and integrity.

At block 338, one or more nodes of system 100 determines whether the conditions to provide the resource to the requestor are currently being satisfied, such as determining whether user device 104 is authorized to access the resource, determining whether the requestor is currently looking at a display screen of user device 104, determining an IP address assigned to user device 104 (for purposes of determining whether user device 104 is operating in an authorized local-area network), etc. In some cases, one or more of the conditions are verified by one node, and one or more other conditions are verified by one or more different nodes. For example, if the authorization record indicates that the requestor must be looking at the screen and also that the resource may only be provided to one or more identified IP addresses, user device 104 may determine if the requestor is currently looking at a display screen of user device 104, while resource manager 126 may determine if a request to provide the resource comprises one of the one or more identified IP addresses listed in the authorization record. In one embodiment, each node is provided with a requestor DID and resource DID as the request to access the resource is routed through network 100 from one node to another, from user device 104 to resource manager 126, for example. The DIDs identify an authorization record identified associated with the request that was published to the blockchain authentication network 110 previously. Each node references the conditions in the authorization record (in some embodiments, retrieving and storing the authorization record internally), and evaluates any conditions that are relevant to each particular node in a chain of nodes that are used to deliver the resource. For example, resource manager 126 is responsible for providing the resource from a database, for example, to wide-area network 122, routers of wide-area network 122 are responsible for routing the resource in accordance with well-known networking principles, a router that is part of local-area network 124 is responsible for routing the resource from wide-area network 122 to user device 104, and user device 104 is responsible for receiving the resource from local-area network 124 and providing it to the requestor. Each one of these nodes may need to verify a condition particular to each node. For example, the authorization record may state that the resource may only be accessed when user device 104 is connected to a particular IP address while the user is looking at user device 104. Resource manager 126 and the routers of wide-area network 122 may each determine that an IP address in a resource request received from user device 104 matches the allowed IP address listed in the authorization record for the particular resource being requested. User device 104 determines whether the requestor is currently looking at the display screen. When the conditions listed in the authorization record are satisfied, as determined by each node in the chain of delivery of the resource, is the resource provided to the requestor. In one embodiment, when each node in the chain of delivery verifies one or more conditions listed in the authorization record, each node may report such verification by sending a "transaction" to blockchain authorization network 110, where a smart contract verifies the transaction and is published by all of the nodes 112 of blockchain authorization network 110. When each node has confirmed that the conditions of the authorization record have been satisfied, a block is published that indicates that all of the conditions have been met, and device 104 can access the block to know if it can provide the resource, due to the fact that other nodes have verified one or more conditions not verified by user device 104.

In another embodiment, a single node, such as access policy evaluator node 106, may determines whether all conditions are met, in an embodiment where the resource is routed through the particular node. Upon determination that the conditions have been met, the particular node may publish an indication of such to blockchain authorization network 110, which may execute a smart contract that verifies that the particular node is a valid evaluator. Alternatively, the particular node may provide indications to a smart contract operating on blockchain authorization network 110 whether each condition listed in the authorization record is currently being met, so that the consensus mechanism of blockchain authorization network 110 can ensure that the conditions are being met. In a related embodiment, the particular node may provide indications of only some of the conditions of whether they are being met, while other conditions are verified by other nodes. However, each of the verifying nodes provides one or more indications to the smart contract, and the smart contract verifies when all of the conditions have been met. In another related embodiment, the conditions may be grouped into rules enforceable by a single node each. This eliminates the need to cross-check with all involved nodes whether all conditions are met for the requested access. In this case, before forwarding the resource from one node to another, a sending node evaluates any conditions in the authorization record pertinent to that node, and only if the condition(s) is/are met does the sending node forward the resource to the next node in the chain. This continues from a source node (for example, resource manager 126) to a destination node (for example, user device 104). In this way, when the resource reaches the destination node, it implies that all of the conditions have been met, and the destination node may present the resource to the requestor.

In any case, when all of the conditions listed in the authorization record are satisfied, processor 200 provides the resource to the requestor, i.e., displays a document to the requestor, allows access to a remote web server, allows access to a remote software application, allows control of a remote vehicle, allows receipt of a data stream from a remote asset, etc. If all of the conditions are not satisfied, processor 200 generally does not provide the resource to the requestor.

At block 340, processor 200 may receive a request from the requestor to manage the resource, for example, a request to print a document, store a document on a hard drive or on a removable memory device, etc. Processor 200 determines whether the requestor has permission to do so, based on the authorization record stored in memory 202 of user device 104. If so, processor 200 allows the requestor to manage the resource. If not, processor 200 denies the request and generally notifies the requestor.

At block 342, processor 200 may continue to determine whether all of the conditions specified in the authorization record are continuously being satisfied. Generally, if at any time at least one of the conditions are not presently being satisfied, processor may deny further access to the resource, i.e., by blanking the display screen, interrupting a remote networking session, interrupting a data stream, deleting a local copy of a document, etc.

In the description above, certain aspects and embodiments of the invention may be applied independently and some of them may be applied in combination as would be apparent to those of skill in the art. For the purposes of explanation, specific details are set forth in order to provide a thorough understanding of embodiments of the invention.

The above description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure.

The terms "computer-readable medium", "memory", "storage medium", and "information storage device" includes, but is not limited to, portable or non-portable electronic information storage devices, optical storage devices, and various other mediums capable of storing, containing, or carrying instruction(s) and/or data. These terms each may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, RAM, ROM, flash memory, solid state disk drives (SSD), etc. A computer-readable medium or the like may have stored thereon code and/or processor-executable instructions that may represent a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable code", or code symbols to perform the necessary tasks (e.g., a computer-program product) may be stored in a computer-readable or machine-readable medium. A processor(s) may perform the necessary tasks.

We claim:

1. A resource access system for authorizing access to a resource, comprising: a first computing node that generates an authorization event template comprising at least one condition for accessing the resource; an authorization blockchain network that stores the authorization event template; a second computing node that receives a request to access the resource from a requestor via a third computing node, that verifies that the requestor has permission to access the resource, and that generates an authorization record when the requestor is determined to have permission to access the resource, the authorization record based on the authorization event template and an identity of the requestor, the authorization record comprising the at least one condition for accessing the resource; and the third computing node that receives the authorization record and that determines whether the at least one condition is being satisfied; wherein the third computing node provides the resource to the requestor only when the at least one condition is being satisfied.

2. The system of claim 1, wherein determining that the at least one condition listed in the authorization record is satisfied comprises: retrieving, by the second computing node, the authorization record from the authorization blockchain network; providing, by the second computing node, the authorization record to the third computing node; and determining, by the third computing node, that the at least one condition has been satisfied.

3. The system of claim 2, wherein the at least one condition is selected from the group consisting of a) a user of the third computing node is looking at the third computing node, b) the third computing node is authorized to provide the resource to the user, c) the third computing node is accessing the resource over an authorized local-area network, d) the resource is being accessed during a predefined time period, e) the third computing node is accessing the resource of an authorized wide-area network and f) the third computing node is within a predefined geographic area.

4. The system of claim 1, wherein the at least one condition comprises a first condition and a second condition, wherein access to the resource is granted by the third computing node only when both the first condition and the second condition are satisfied.

5. The system of claim 1, wherein the authorization event template further comprises one or more permissions for managing the resource, and the authorization record further comprises the one or more permissions for managing the resource, the system further configured to: receive, by the third computing node, a request by a user of the third computing node to manage the resource in a first particular manner; determine, by the third computing node, that the user has permission to manage the resource in the first particular manner by determining, from the one or more permissions in the authorization record, that the first particular manner is listed as one of the one or more permissions.

6. The system of claim 5, wherein the one or more permissions are selected from the group consisting of one or more read permissions, one or more write permissions, one or more print permissions, one or more store permissions, one or more copy permissions, one or more forwarding permissions, and one or more audio or visual rendering permissions.

7. The system of claim 1, wherein verifying that the requestor has permission to access the resource comprises: generating, by the first computing node, a verifiable credential definition in association with the resource; submitting the verifiable credential definition to a verifiable credential blockchain network; generating, by the first computing node, a verifiable credential to a user in accordance with the verifiable credential definition; receiving, by the second computing node, a verifiable presentation from the third computing node, the verifiable presentation comprising one or more claims; verifying, by the second computing node, the one or more claims in the verifiable presentation against the verifiable credential stored on the verifiable credential blockchain.

\* \* \* \* \*